United States Patent
Matsuki et al.

(10) Patent No.: US 10,793,758 B2
(45) Date of Patent: Oct. 6, 2020

(54) TWO-PACK TYPE URETHANE-BASED ADHESIVE COMPOSITION

(71) Applicant: THE YOKOHAMA RUBBER CO., LTD., Minato-Ku, Tokyo (JP)

(72) Inventors: Yuichi Matsuki, Hiratsuka (JP); Megumi Abe, Hiratsuka (JP); Takanori Kido, Hiratsuka (JP); Hideyuki Matsuda, Hiratsuka (JP); Masaki Yamamoto, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 15/315,524

(22) PCT Filed: May 25, 2015

(86) PCT No.: PCT/JP2015/064931
§ 371 (c)(1),
(2) Date: Dec. 1, 2016

(87) PCT Pub. No.: WO2015/186555
PCT Pub. Date: Dec. 10, 2015

(65) Prior Publication Data
US 2017/0204311 A1 Jul. 20, 2017

(30) Foreign Application Priority Data

Jun. 3, 2014 (JP) ................. 2014-114544

(51) Int. Cl.
| | | |
|---|---|---|
| *C08G 18/12* | (2006.01) | |
| *C08G 18/48* | (2006.01) | |
| *C09J 175/14* | (2006.01) | |
| *C08G 18/81* | (2006.01) | |
| *C08G 18/20* | (2006.01) | |
| *C08G 18/78* | (2006.01) | |
| *C09J 175/08* | (2006.01) | |
| *C08G 18/67* | (2006.01) | |
| *C09J 175/16* | (2006.01) | |
| *C08G 18/76* | (2006.01) | |
| *C09J 11/04* | (2006.01) | |
| *C08K 3/04* | (2006.01) | |
| *C08K 3/26* | (2006.01) | |

(52) U.S. Cl.
CPC ............ *C09J 175/14* (2013.01); *C08G 18/12* (2013.01); *C08G 18/2081* (2013.01); *C08G 18/4812* (2013.01); *C08G 18/4825* (2013.01); *C08G 18/4829* (2013.01); *C08G 18/672* (2013.01); *C08G 18/7671* (2013.01); *C08G 18/7837* (2013.01); *C08G 18/8175* (2013.01); *C09J 11/04* (2013.01); *C09J 175/08* (2013.01); *C09J 175/16* (2013.01); *C08K 3/04* (2013.01); *C08K 3/26* (2013.01); *C08K 2003/265* (2013.01)

(58) Field of Classification Search
CPC ........ C09J 175/14; C09J 175/16; C09J 11/06; C09J 175/08; C08G 18/12; C08G 18/2081; C08G 18/48; C08G 18/4812; C08G 18/4825; C08G 18/4829; C08G 18/672; C08G 18/7671; C08G 18/7837; C08G 18/8175
See application file for complete search history.

(56) References Cited

U.S. PATENT DOCUMENTS

| | | | | |
|---|---|---|---|---|
| 5,603,798 | A * | 2/1997 | Bhat | C08G 18/10 156/331.4 |
| 6,723,936 | B2 * | 4/2004 | Ootsuka | C08J 5/124 156/230 |
| 7,223,821 | B2 * | 5/2007 | Okuhira | C08G 18/10 525/476 |
| 2010/0209713 | A1 * | 8/2010 | Qin | B32B 7/12 428/423.1 |
| 2011/0070448 | A1 * | 3/2011 | Matsumura | B29C 53/04 428/412 |
| 2013/0233488 | A1 * | 9/2013 | Jialanella | C08G 18/10 156/331.7 |

FOREIGN PATENT DOCUMENTS

| | | |
|---|---|---|
| JP | 2006-176664 A | 7/2006 |
| JP | 2007-031483 A | 2/2007 |
| JP | 2007-054796 A | 3/2007 |
| JP | 2013-104018 A | 5/2013 |
| WO | 2012/042670 A1 | 4/2012 |
| WO | WO-2012087490 A1 * | 6/2012 ............ C08G 18/10 |

* cited by examiner

*Primary Examiner* — Karuna P Reddy
(74) *Attorney, Agent, or Firm* — Carrier Blackman & Associates, P.C.; Joseph P. Carrier; Fulchand P. Shende

(57) ABSTRACT

An object of the present invention is to provide a two-part urethane-based adhesive composition that exhibits excellent adhesion to a base material without using a primer. A two-part urethane-based adhesive composition according to the present invention contains: a main agent that contains a urethane prepolymer having an isocyanate group; and a curing agent that contains a compound having two or more active hydrogen-containing groups in each molecule. One or both of the main agent and the curing agent contain a (meth)acrylamide compound.

4 Claims, No Drawings

TWO-PACK TYPE URETHANE-BASED ADHESIVE COMPOSITION

TECHNICAL FIELD

The present invention relates to a two-part urethane-based adhesive composition.

BACKGROUND ART

In recent years, resin materials (e.g. olefin-based resins, matrix resins of fiber reinforced plastic (FRP), and the like) have been used for automobile bodies in place of steel plates from the perspective of reducing weight.

Adhesion of such a resin material with a different type of raw material (e.g. glass) has been typically performed by using a primer after the resin material has been subjected to flame processing (e.g. see Patent Documents 1 and 2, and the like).

As a raw material to adhere a window glass of an automobile to a coated automobile body (body), a direct glazing adhesive (DG) has been used.

The inventors of the present application have previously proposed a one-part moisture curable urethane composition that can be used as a direct glazing material (Patent Document 3).

CITATION LIST

Patent Literature

Patent Document 1: Japanese Unexamined Patent Application Publication No. 2007-031483A
Patent Document 2: Japanese Unexamined Patent Application Publication No. 2013-104018A
Patent Document 3: Japanese Unexamined Patent Application Publication No. 2006-176664A

SUMMARY OF INVENTION

Technical Problem

However, problems of negatively affecting environment exist since a primer contains a large amount of solvent.

Furthermore, to enhance productivity, demands for applying a curing agent to an adhesive agent used for DG to accelerate curing speed have been increasing.

However, the inventors of the present invention have found that, when a curing agent was applied to an adhesive agent used for DG to accelerate curing speed, the adhesion (e.g. initial adhesion and hot water-resistant adhesion; hereinafter the same) to a base material (mainly a resin base material, especially an olefin resin) was deteriorated in some cases.

Therefore, an object of the present invention is to provide a two-part urethane-based adhesive composition that exhibits excellent adhesion to a base material (mainly a resin base material, especially an olefin resin) without using a primer. Note that the condition where excellent adhesion to a base material is exhibited without using a primer is also described as having excellent adhesion hereinafter. Furthermore, the adhesion may include, for example, initial adhesion and/or hot water-resistant adhesion.

Solution to Problem

As a result of diligent research to solve the problems described above, the inventors of the present invention have found that a two-part urethane-based adhesive composition that contains a (meth)acrylamide compound exhibits excellent adhesion, and thus completed the present invention.

Specifically, the inventors discovered that the object described above can be achieved by the following features.

1. A two-part urethane-based adhesive composition comprising: a main agent containing a urethane prepolymer having an isocyanate group; and a curing agent containing a compound having two or more active hydrogen-containing groups in each molecule; one or both of the main agent and the curing agent containing a (meth)acrylamide compound.
2. The two-part urethane-based adhesive composition according to 1 above, where at least one alkyl group that may have a hetero atom is bonded to a nitrogen atom of an amide bond contained in the (meth)acrylamide compound.
3. The two-part urethane-based adhesive composition according to 1 or 2 above, where a molar ratio of the isocyanate group to the active hydrogen-containing group (isocyanate group/active hydrogen-containing group) is from 0.8 to 20.0.
4. The two-part urethane-based adhesive composition according to any one of 1 to 3 above, where the urethane prepolymer is a urethane prepolymer formed by reacting a polyether polyol and an aromatic polyisocyanate.
5. The two-part urethane-based adhesive composition according to any one of 1 to 4 above, where at least one of the main agent and the curing agent further contain at least one of carbon black and calcium carbonate.
6. The two-part urethane-based adhesive composition according to any one of 1 to 5 above, where a content of the (meth)acrylamide compound is from 0.01 to 30 mass % in the two-part urethane-based adhesive composition.
7. The two-part urethane-based adhesive composition according to any one of 1 to 6 above, where the two-part urethane-based adhesive composition is cured by moisture.
8. The two-part urethane-based adhesive composition according to any one of 1 to 7 above, where the two-part urethane-based adhesive composition is used to adhere an olefin base material.
9. The two-part urethane-based adhesive composition according to any one of 1 to 8 above, where the (meth)acrylamide compound is at least one type selected from the group consisting of N-alkyl(meth)acrylamide having a hydroxy group and N-alkyl(meth)acrylamide having an ether bond.

Advantageous Effects of Invention

The two-part urethane-based adhesive composition of the present invention exhibits excellent adhesion to a base material without using a primer.

DESCRIPTION OF EMBODIMENT

The two-part urethane-based adhesive composition of the present invention (hereinafter, abbreviated as "adhesive composition of the present invention") is a two-part urethane-based adhesive composition comprising: a main agent containing a urethane prepolymer having an isocyanate group; and a curing agent containing a compound having two or more active hydrogen-containing groups in each molecule; one or both of the main agent and the curing agent containing a (meth) acrylamide compound.

In the present invention, as described above, excellent adhesion to a base material (especially an olefin resin) is achieved without using a primer by allowing the (meth) acrylamide compound to be contained.

Although the reason is not clear in detail, it is conceived that, because the (meth)acrylamide compound is readily impregnated into a base material and a compound having a urethane prepolymer and/or active hydrogen-containing group is involved in the impregnation of the base material with the (meth)acrylamide compound, excellent adhesion between the adhesive layer and the base material is achieved after the adhesive composition of the present invention is cured.

Note that the mechanism described above is a deduction of the present inventors, and, even in cases involving different mechanisms, such mechanisms are within the scope of the present invention.

Main Agent

The main agent of the adhesive composition of the present invention contains a urethane prepolymer having an isocyanate group.

Urethane Prepolymer

A urethane prepolymer contained in the main agent of the adhesive composition of the present invention is a polymer containing a plurality of isocyanate groups at a molecular terminal in each molecule.

A conventionally known urethane prepolymer can be used as such a urethane prepolymer. For example, a reaction product, obtained by reacting a polyisocyanate compound with a compound having at least two active hydrogen-containing groups in each molecule (hereinafter, this is abbreviated as "active hydrogen compound") in a manner that the amount of the isocyanate group is in excess relative to the amount of the active hydrogen-containing groups, or the like can be used.

In the present invention, "active hydrogen-containing group" indicates "group containing an active hydrogen". Examples of the active hydrogen-containing group include a hydroxy group, amino group, and imino group.

Polyisocyanate Compound

The polyisocyanate compound used during production of the urethane prepolymer is not particularly limited as long as the polyisocyanate compound has two or more isocyanate groups in each molecule.

Examples of the polyisocyanate compound include aromatic polyisocyanates, such as tolylene diisocyanate (TDI; e.g. 2,4-tolylene diisocyanate and 2,6-tolylene diisocyanate), diphenylmethane diisocyanate (MDI; e.g. 4,4'-diphenylmethane diisocyanate and 2,4'-diphenylmethane diisocyanate), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic and/or alicyclic polyisocyanates, such as hexamethylene diisocyanate (HDI), trimethylhexamethylene diisocyanate (TMHDI), lysine diisocyanate, and norbornane diisocyanate (NBDI), transcyclohexane-1,4-diisocyanate, isophorone diisocyanate (IPDI), bis(isocyanate methyl)cyclohexane ($H_6XDI$), and dicyclohexylmethane diisocyanate ($H_{12}MDI$); carbodiimide-modified polyisocyanates of these; isocyanurate-modified polyisocyanates of these.

Such a polyisocyanate compound may be used alone, or a combination of two or more types of these polyisocyanate compounds may be used.

Among these, an aromatic polyisocyanate is preferable, and MDI is more preferable, from the perspective of excellent curability.

Active Hydrogen Compound

The compound having two or more active hydrogen-containing groups in each molecule (active hydrogen compound) that is used during production of the urethane prepolymer is not particularly limited. Examples of the active hydrogen-containing group include a hydroxy (OH) group, amino group, and imino group.

Preferred examples of the active hydrogen compound include polyol compounds having two or more hydroxy (OH) groups in each molecule, polyamine compounds having two or more amino groups and/or imino groups in each molecule, and the like. Among these, a polyol compound is preferable.

The molecular weight, skeleton, and the like of the polyol compound are not particularly limited as long as the polyol compound is a compound having two or more OH groups. Specific examples thereof include polyether polyols; polyester polyols; polymer polyols having a carbon-carbon bond in a main chain skeleton, such as acrylic polyols, polybutadiene diols, and hydrogenated polybutadiene polyols; low-molecular-weight polyhydric alcohols; and mixed polyols of these. Among these, a polyether polyol is exemplified as an example of preferable aspects.

The polyether polyol is not particularly limited as long as the polyether polyol is a compound having a polyether as a main chain and having two or more hydroxy groups. "Polyether" is a group having two or more ether bonds, and specific examples thereof include a group having a total of two or more of structural units: —$R^a$—O—$R^b$—. Note that, in the structural unit, $R^a$ and $R^b$ each independently represent a hydrocarbon group. The hydrocarbon group is not particularly limited. Examples thereof include a straight-chain alkylene group having from 1 to 10 carbons.

Examples of the polyether polyol include a polyoxyethylene diol (polyethylene glycol), polyoxypropylene diol (polypropylene glycol; PPG), polyoxypropylene triol, ethylene oxide/propylene oxide copolymer, polytetramethylene ether glycol (PTMEG), polytetraethylene glycol, sorbitol polyol, and the like.

The polyether polyol is preferably polypropylene glycol or polyoxypropylene triol from the perspective of excellent miscibility with a polyisocyanate compound.

The weight average molecular weight of the polyether polyol is preferably from 500 to 20,000 because the viscosity of the urethane prepolymer, obtained by a reaction with an isocyanate compound, exhibits an appropriate fluidity at the ambient temperature. In the present invention, the weight average molecular weight is a value obtained by GPC analysis (solvent: tetrahydrofuran (THF)) based on calibration with polystyrene.

The active hydrogen compound may be used alone, or a combination of two or more types of the active hydrogen compounds may be used.

The urethane prepolymer is preferably a urethane prepolymer formed by reacting a polyether polyol and an aromatic polyisocyanate compound, from the perspective of achieving even better adhesion and excellent curability.

The urethane prepolymer may be used alone, or a combination of two or more types of the urethane prepolymers may be used.

The method of producing the urethane prepolymer is not particularly limited. For example, the urethane prepolymer can be produced by using a polyisocyanate compound in a manner that from 1.5 to 2.5 mol of isocyanate group is reacted per 1 mol of the active hydrogen-containing group (e.g. hydroxy group) contained in the active hydrogen compound, and mixing these to perform a reaction.

Curing Agent

The curing agent of the adhesive composition of the present invention contains a compound having two or more active hydrogen-containing groups in each molecule.

Compound having Two or More Active Hydrogen-Containing Groups in Each Molecule

The compound having two or more active hydrogen-containing groups in each molecule contained in the curing agent (curing agent in a broad sense) of the adhesive composition of the present invention is a component that cures the urethane prepolymer contained in the main agent described above (curing agent component in a narrow sense).

Examples of the compound having two or more active hydrogen-containing groups in each molecule contained in the curing agent include the same compounds as those exemplified as the active hydrogen compound used during the production of the urethane prepolymer. Among these, a polyol compound is preferable. The polyol compound is the same as the polyol compounds described above.

In particular, the polyol compound is preferably a polyether polyol, from the perspective of achieving even better adhesion and excellent curability. The polyether polyol is the same as the polyether polyol described above.

The compound having two or more active hydrogen-containing groups in each molecule contained in the curing agent may be used alone, or a combination of two or more types thereof may be used.

The molar ratio of the isocyanate group contained in the urethane prepolymer to the active hydrogen-containing group contained in the compound having two or more active hydrogen-containing groups in each molecule contained in the curing agent (isocyanate group/active hydrogen-containing group) is preferably from 1.0 to 20, and more preferably from 1.4 to 10, from the perspective of achieving even better adhesion and excellent curability.

The (meth)acrylamide compound will be described below.

The (meth)acrylamide compound contained in the adhesive composition of the present invention is not particularly limited as long as the (meth)acrylamide compound is a compound having at least one group represented by $CH_2=CR-CO-N$ in each molecule (R is a hydrogen atom or methyl group).

Note that, in the present invention, the (meth)acrylamide compound does not include polymers obtained by using the (meth)acrylamide compound as a monomer and polymerizing a vinyl group or an isopropenyl group contained in the (meth) acrylamide compound.

Examples of the (meth)acrylamide compound include compounds represented by Formula (1) below.

[Chemical Formula 1]

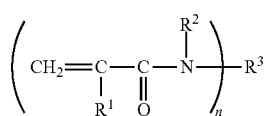

(1)

In Formula (1), $R^1$ represents a hydrogen atom or methyl group.

In Formula (1), $R^2$ and $R^3$ each independently represent a hydrogen atom or a hydrocarbon group that may have a hetero atom. Examples of the hetero atom include an oxygen atom, nitrogen atom, and sulfur atom. When n is 1 and $R^2$ and/or $R^3$ is a hydrocarbon group that may have a hetero atom, $R^2$ and $R^3$ may be bonded to each other to form a ring structure.

When $R^2$ and $R^3$ are hydrogen atoms, the compound represented by Formula (1) is (meth)acrylamide.

In Formula (1), n is 1 or greater, and preferably 1 or 2.

The hydrocarbon group is not particularly limited. The number of carbons contained in the hydrocarbon group may be from 1 to 20. Examples of the hydrocarbon group include aliphatic hydrocarbon groups having from 1 to 20 carbons, cycloaliphatic hydrocarbon groups having from 3 to 20 carbons, aromatic hydrocarbon groups having from 6 to 20 carbons, and combinations thereof. The hydrocarbon group may be a straight-chain or branched hydrocarbon group, and may have an unsaturated bond.

Examples of the aliphatic hydrocarbon group having from 1 to 20 carbons include a methyl group, ethyl group, propyl group, butyl group, pentyl group, hexyl group, octyl group, decyl group, and eicosyl group.

Examples of the alicyclic hydrocarbon group having from 3 to 20 carbons include a cyclopentyl group and cyclohexyl group.

Examples of the aromatic hydrocarbon group having from 6 to 20 carbons include a phenyl group, naphthalene ring, and anthracene ring.

Among these, the hydrocarbon group is preferably an aliphatic hydrocarbon group.

When the hydrocarbon group has a hetero atom, for example, at least one of the carbon atoms in the hydrocarbon group having two or more carbons may be substituted by hetero atom(s) or functional group(s) having a hetero atom (e.g. functional group that is at least divalent), and/or at least one of the hydrogen atom in the hydrocarbon group (in this case, the number of carbons is not limited) may be substituted by functional group(s) having a hetero atom (e.g. functional group that is monovalent).

Examples of the functional group include monovalent functional groups, such as a hydroxy group, amino group, mercapto group, isocyanate group, and alkoxysilyl group; and functional groups that are at least divalent, such as a carbonyl group, urethane bond, urea bond, and allophanate bond.

When the at least one of the carbon atoms in the hydrocarbon group is substituted by hetero atom(s), the hetero atom(s) may form an ether bond, secondary amine, tertiary amine, or sulfide bond.

Examples of the hydrocarbon group in which at least one of the carbon atoms in the hydrocarbon group is substituted by hetero atom(s) include tertiary amines, such as N,N-dimethylaminopropyl group; and ether bonds, such as $-CH_2CH_2-O-CH_2CH_2-$.

Examples of the hydrocarbon group in which at least one of the carbon atoms in the hydrocarbon group is substituted by functional group(s) having a hetero atom include hydrocarbon groups having a carbonyl group as the functional group, such as 1,1-dimethyl-3-oxobutyl group.

When $R^2$ and $R^3$ are bonded each other to form a ring structure in Formula (1) above, examples of the bonded $R^2$ and $R^3$ include divalent hydrocarbon groups that may have an ether bond. Examples of the divalent hydrocarbon group having an ether bond include $-R^4-O-R^5-$. In the formula above, $R^4$ and $R^5$ are each independently a divalent hydrocarbon group.

The number of carbons contained in the divalent hydrocarbon group as $R^4$ and $R^5$ is preferably from 1 to 20. The divalent hydrocarbon group as $R^4$ and $R^5$ is preferably a divalent aliphatic hydrocarbon group. Examples of the divalent aliphatic hydrocarbon group include a methylene group, ethylene group, and trimethylene group.

Examples of the divalent aliphatic hydrocarbon group having an ether bond include —CH$_2$CH$_2$—O—CH$_2$CH$_2$—.

When R$^2$ and R$^3$ are bonded to each other to form a ring structure, examples of the ring structure include a morpholino group.

Among these, the (meth)acrylamide compound is preferably a compound in which at least one alkyl group that may have a hetero atom is bonded to a nitrogen atom of an amide bond contained in the (meth)acrylamide compound, and is more preferably a compound in which one or both of R$^2$ and R$^3$ in Formula (1) are hydrocarbon group(s) that may have a hetero atom, from the perspective of achieving excellent adhesion and excellent miscibility with a urethane prepolymer and/or a matrix component, such as a compound having two or more active hydrogen-containing groups in each molecule (e.g. polyol). Furthermore, from the perspective of achieving excellent miscibility with the (meth)acrylamide compound, the urethane prepolymer is preferably a liquid at ambient temperature.

Examples of the compound in which one or both of R$^2$ and R$^3$ in Formula (1) are hydrocarbon group(s) that may have a hetero atom include N-alkyl(meth)acrylamide, N-alkyl (meth)acrylamide having a hydroxy group, and N-alkyl (meth)acrylamide having an ether bond.

Note that, in the present invention, N-alkyl(meth)acrylamide includes N-monoalkyl(meth)acrylamide and N,N-dialkyl(meth)acrylamide. Furthermore, in the N-alkyl(meth) acrylamide, at least one carbon atom contained in the alkyl group may be substituted by the hetero atom described above.

Furthermore, in the N-alkyl(meth)acrylamide having a hydroxy group, the at least one alkyl group that is bonded to a nitrogen atom of the acrylamide group may have a hydroxy group. "(Meth)acrylamide compound in which the alkyl group bonded to a nitrogen atom of the acrylamide group has a hydroxy group" is referred to as "N-hydroxy group-containing alkyl(meth)acrylamide".

In the N-alkyl(meth)acrylamide having an ether bond, the at least one alkyl group that is bonded to a nitrogen atom of the acrylamide group may have an ether bond. "(Meth) acrylamide compound in which the alkyl group bonded to a nitrogen atom of the acrylamide group has an ether bond" is referred to as "N-ether bond-containing alkyl(meth)acrylamide". In the N-ether bond-containing alkyl(meth)acrylamide, the alkyl group that is bonded to the nitrogen atom of the acrylamide group and that has an ether bond may be bonded to the nitrogen atom so that the alkyl group having an ether bond and the nitrogen atom together form a ring structure.

Specific examples of the compound in which one or both of R$^2$ and R$^3$ in Formula (1) are hydrocarbon group(s) that may have a hetero atom include the following:

unsubstituted N-alkyl(meth)acrylamides, such as N,N-dimethyl(meth)acrylamide (DMAA) and N,N-diethyl(meth) acrylamide (DEAA);

N-tertiary amine-containing alkyl(meth)acrylamides, such as N-(N,N-dimethylaminopropyl)(meth)acrylamide (DMAPAA);

N-ether bond-containing alkyl(meth)acrylamides represented by Formula (2) below:

[Chemical Formula 2]

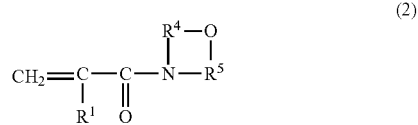

(2)

(in Formula (2), R$^1$ represents a hydrogen atom or methyl group, R$^4$ and R$^5$ each independently represent a divalent aliphatic hydrocarbon group; the divalent aliphatic hydrocarbon group as R$^4$ and R$^5$ are the same as those described above), where specific examples of the N-ether bond-containing alkyl(meth)acrylamide include acryloylmorpholine (ACMO) represented by formula below and methacryloylmorpholine;

[Chemical Formula 3]

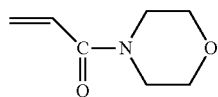

N-hydroxy group-containing alkyl(meth)acrylamides represented by Formula (3) below:

[Chemical Formula 4]

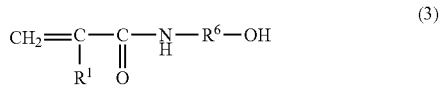

(3)

(in Formula (3), R$^1$ represents a hydrogen atom or methyl group, and R$^6$ represents a divalent aliphatic hydrocarbon group; the divalent aliphatic hydrocarbon group as R$^6$ is the same as the divalent aliphatic hydrocarbon group as R$^4$ and R$^5$), where specific examples of the N-hydroxy group-containing alkyl(meth)acrylamide include N-hydroxyethylacrylamide (HEAA) and N-hydroxyethylmethacrylamide;

N-carbonyl group-containing alkyl(meth)acrylamides, such as N-(1,1-dimethyl-3-oxobutyl) acrylamide (DAAM; diacetone acrylamide) represented by formula below:

[Chemical Formula 5]

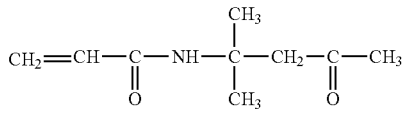

and reaction products of a polyisocyanate compound and N-hydroxy group-containing alkyl(meth)acrylamide.

Examples of the reaction product of a polyisocyanate compound and N-hydroxy group-containing alkyl(meth) acrylamide include reaction products of a modified product of aliphatic polyisocyanate and N-hydroxy group-containing alkyl(meth)acrylamide.

An example of preferable aspects of the modified product of aliphatic polyisocyanate has two or more isocyanate groups in each molecule, and the number of the isocyanate groups is more preferably two.

Examples of the modified product of aliphatic polyisocyanate include allophanate-modified bodies of aliphatic polyisocyanate, and specific examples thereof include an allophanate-modified product of hexamethylene diisocyanate (HDI).

An example of preferable aspects of the N-hydroxy group-containing alkyl(meth)acrylamide is (meth)acrylamide having an alkyl group having at least one hydroxy group. The number of the hydroxy group contained in the compound is preferably one in each molecule.

Examples of the N-hydroxy group-containing alkyl(meth)acrylamide include N-hydroxyethyl(meth)acrylamide (HEAA).

The reaction product of a polyisocyanate compound and N-hydroxy group-containing alkyl(meth)acrylamide may be a compound in which at least one or all of the isocyanate groups contained in the polyisocyanate compound and the N-hydroxy group-containing alkyl(meth)acrylamide are reacted, or may be a mixture of these.

Among these, the (meth)acrylamide compound is preferably N-alkyl(meth)acrylamide, N-alkyl(meth)acrylamide having a hydroxy group, and N-ether bond-containing alkyl (meth)acrylamide, more preferably N-hydroxy group-containing alkyl(meth)acrylamide represented by Formula (3) and N-ether bond-containing alkyl(meth)acrylamide represented by Formula (2), and even more preferably DMAA, DEAA, HEAA, and ACMO, from the perspective of achieving excellent adhesion and excellent miscibility with a urethane prepolymer and/or a compound having two or more active hydrogen-containing groups in each molecule.

Furthermore, the (meth)acrylamide compound is preferably N-alkyl(meth)acrylamide, N-alkyl(meth)acrylamide having a hydroxy group, and N-ether bond-containing alkyl (meth)acrylamide, more preferably N-alkyl(meth)acrylamide having a hydroxy group and N-ether bond-containing alkyl(meth)acrylamide, even more preferably N-hydroxy group-containing alkyl (meth)acrylamide represented by Formula (3) and N-ether bond-containing alkyl(meth)acrylamide represented by Formula (2), and particularly preferably HEAA and ACMO, from the perspective of achieving excellent hot water-resistant adhesion.

An example of preferable aspects is one in which the (meth)acrylamide compound is contained in the curing agent, from the perspective of achieving excellent hot water-resistant adhesion.

Furthermore, the (meth)acrylamide compound is preferably N-ether bond-containing alkyl(meth)acrylamide having an ether bond, more preferably N-ether bond-containing alkyl(meth)acrylamide represented by Formula (2), and even more preferably ACMO, from the perspective of achieving excellent initial adhesion.

An example of preferable aspects is one in which the (meth)acrylamide compound is contained in the main agent, from the perspective of achieving excellent initial adhesion.

The (meth)acrylamide compound may be used alone, or a combination of two or more types of (meth)acrylamide compounds may be used. The production of the (meth)acrylamide compound is not particularly limited. Examples thereof include conventionally known methods.

The content of the (meth)acrylamide compound is preferably from 0.01 to 30 mass %, and more preferably from 0.1 to 5 mass %, in the two-part urethane-based adhesive composition from the perspectives of achieving excellent adhesion and achieving excellent workability since the viscosity of the main agent and/or the curing agent containing the (meth)acrylamide compound (e.g. viscosity at the ambient temperature) becomes appropriate.

The adhesive composition of the present invention preferably further contains carbon black and/or calcium carbonate in the main agent and/or the curing agent from the perspective of achieving excellent adhesion and excellent physical properties of the cured product of the two-part urethane-based adhesive composition, such as hardness.

The carbon black that can be used in the adhesive composition of the present invention is not particularly limited. Examples thereof include conventionally known carbon black. A single carbon black can be used or a combination of two or more carbon blacks can be used.

In the present invention, the content of the carbon black is preferably from 10 to 80 parts by mass, and more preferably from 15 to 60 parts by mass, per 100 parts by mass of the two-part urethane-based adhesive composition.

The calcium carbonate that can be used in the adhesive composition of the present invention is not particularly limited. Examples thereof include heavy calcium carbonate, precipitated calcium carbonate (light calcium carbonate), and colloidal calcium carbonate. For example, the calcium carbonate may have undergone a surface treatment with a fatty acid, fatty acid ester, or the like. The calcium carbonate may be used alone, or a combination of two or more types of calcium carbonates may be used.

In the present invention, the content of the calcium carbonate is preferably from 1 to 50 parts by mass, and more preferably from 3 to 30 parts by mass, per 100 parts by mass of the two-part urethane-based adhesive composition.

Optional Component

The adhesive composition of the present invention may contain, if necessary, various additives, in a range that does not inhibit the object of the present invention, such as fillers other than carbon black and calcium carbonate, curing catalysts, plasticizers, antiaging agents, antioxidants, pigments (dyes), thixotropic agents, ultraviolet absorbers, flame retardants, surfactants (including leveling agents), dispersing agents, dehydrating agents, adhesion promoters, and antistatic agents. The amounts of the additives are not particularly limited. For example, the amounts of the additives may be the same as conventionally known amounts.

Note that an example of preferable aspects is one in which the adhesive composition of the present invention is not an aqueous adhesive composition. When the adhesive composition of the present invention contains water, the amount of water can be set to 10 mass % or less in the two-part urethane-based adhesive composition.

The method of producing adhesive composition of the present invention is not particularly limited. For example, the adhesive composition can be produced by a method in which a main agent containing a urethane prepolymer is placed in a container and a curing agent containing a compound having two or more active hydrogen-containing groups in each molecule is placed in another container, and then separately mixing the contents of the containers in a nitrogen gas atmosphere. At this time, a (meth)acrylamide compound may be added to one or both of the main agent and the curing agent.

The adhesive composition of the present invention is a two-part type.

In the present invention, one or both of the main agent and the curing agent contain a (meth)acrylamide compound. An example of preferable aspects is one in which one of the main agent or the curing agent contains a (meth)acrylamide compound.

When at least the curing agent contains the (meth)acrylamide compound, it is preferable because excellent adhesion (in particular, hot water-resistant adhesion) and excellent storage stability are achieved.

When at least the main agent contains the (meth)acrylamide compound, it is preferable because excellent adhesion (in particular, initial adhesion) is achieved.

The adhesive composition of the present invention is used by mixing the main agent and the curing agent. The method of mixing is not particularly limited. Examples thereof include conventionally known methods.

Examples of the base material to which the adhesive composition of the present invention can be applied include plastics, glass, rubbers, metals, and the like.

Examples of the plastic include polymers of propylene-, ethylene-, and/or cycloolefin-based monomers. The polymers described above may be homopolymers, copolymers, or hydrogenated products.

Specific examples of the plastic include olefin resins, such as polypropylene, polyethylene, COP, and COC, polyester resins, such as polyethylene terephthalate (PET) and polybutylene terephthalate (PBT), polymethyl methacrylate resins (PMMA resins), polycarbonate resins, polystyrene resins, acrylonitrile-styrene copolymer resins, polyvinyl chloride resins, acetate resins, ABS resins (acrylonitrile-butadiene rubber-styrene copolymer), and hardly adhesive resins, such as polyamide resins.

Note that "COC" indicates cycloolefin copolymers, such as copolymers of tetracyclododecene and olefin such as ethylene.

Furthermore, "COP" indicates cycloolefin polymers, such as polymers obtained by, for example, subjecting norbornenes to a ring-opening polymerization and hydrogenation.

The base material may have undergone a surface treatment. Examples of the surface treatment include flame treatment, corona treatment, and ITRO treatment. These treatments are not particularly limited. Examples thereof include conventionally known methods.

The method of applying the adhesive composition of the present invention to the base material is not particularly limited. Examples thereof include conventionally known methods.

The adhesive composition of the present invention can be cured by moisture. For example, the adhesive composition of the present invention can be cured in the condition of 5 to 90° C. at a relative humidity of 5 to 95 (% RH).

Note that, in the present invention, an example of preferable aspects is one in which the adhesive composition of the present invention is not cured by irradiating with light such as ultraviolet light.

Examples of the use of the adhesive composition of the present invention include direct glazing adhesives, sealants for automobiles, and sealants for building components.

EXAMPLES

The present invention is described below in detail using examples, but is in no way limited to these examples.

The main agents and the curing agents were produced by mixing the components in Table 1 below according to the compositions shown in Table 1 (shown as part by mass) using mixers.

Thereafter, 100 g of the main agent produced as described above and the curing agent produced as described above were mixed at a mixing ratio of main agent/curing agent shown in Table 1 to obtain an adhesive composition.

For each of the produced adhesive compositions, adhesion was evaluated by the methods described below. The results are shown in Table 1.

Adhesion (Shear Strength)

Two pieces of adherends formed by subjecting one face of a substrate (width: 25 mm, length: 120 mm, thickness: 3 mm) formed from a polypropylene resin (trade name: Nobrene, manufactured by Sumitomo Chemical Co., Ltd.) to a flame treatment were prepared.

After the adherends were flame-treated, it was confirmed that the wettability on the surface of the resin was 45.0 mN/m or greater, using the Wetting Tension Test Mixture (manufactured by Wako Pure Chemical Industries, Ltd.).

The adhesive composition immediately after the preparation (mixing) was then applied to the surface of one adherend (the face on which the flame treatment was performed) in a manner that the width was 25 mm, the length was 10 mm, and the thickness was 5 mm. Thereafter, the coated surface was adhered to the surface of another adherend (the face on which the flame treatment was performed) and compression-bonded to produce a test sample.

After the produced test sample was left as is under the following conditions, tensile test (tensile speed of 50 mm/min at 20° C.) was performed in accordance with JIS K 6850:1999 to measure the shear strength (MPa). The results are shown in Table 1 below.

Condition 1: left for 3 days in a condition of 23° C. and 50% RH (initial)

Condition 2: left for 3 days in a condition of 23° C. and 50% RH, and then immersed in a hot water at 60° C. for 3 days When the shear strength is 2.5 MPa or greater, the adhesive strength is evaluated as excellent.

Adhesion (Failure State)

For the test sample used for measuring the shear strength, failure state was visually observed, and the case where the cohesive failure was observed in the adhesive was evaluated as "CF", and the case where the interfacial failure was observed between the adherend and the adhesive was evaluated as "AF". The numerical values written after "CF" or "AF" represent approximate areas (%) occupied by the failure states on the adhering surface. The results are shown in Table 1 below.

When the area occupied by CF is 80% or greater, the adhesion is evaluated as excellent.

TABLE 1A

| | | | Comparative Example 1-1 | Additional Working Example 1-1 | Working Example 1 | Comparative Example 2-1 | Additional Working Example 2-1 | Working Example 2 | Comparative Example 3-1 | Additional Working Example 3-1 | Working Example 3 | Comparative Example 4-1 |
|---|---|---|---|---|---|---|---|---|---|---|---|---|
| Main agent | Urethane prepolymer | | 42.4 | 42.4 | 42.4 | 42.4 | 42.4 | 42.4 | 42.4 | 42.4 | 42.4 | 42.4 |
| | (Meth)acrylamide compound | DMAA | | 0.15 | 3.1 | | | | | | | |
| | | DEAA | | | | | 0.15 | 3.1 | | | | |
| | | Isocyanate adduct of HEAA | | | | | | | | 0.15 | 3.1 | |
| | | ACMO | | | | | | | | | | |
| | (Meth)acrylate compound 1 | | | | | | | | | | | |
| | Polymer of (meth)acrylamide compound | | | | | | | | | | | |
| | Carbon black | #200 MP | 20.6 | 20.6 | 20.6 | 20.6 | 20.6 | 20.6 | 20.6 | 20.6 | 20.6 | 20.6 |
| | Calcium carbonate 1 | Super S | 19.3 | 19.3 | 19.3 | 19.3 | 19.3 | 19.3 | 19.3 | 19.3 | 19.3 | 19.3 |
| | Plasticizer | DINP | 17.4 | 17.4 | 17.4 | 17.4 | 17.4 | 17.4 | 17.4 | 17.4 | 17.4 | 17.4 |
| | Catalyst | DMDEE | 0.2 | 0.2 | 0.2 | 0.2 | 0.2 | 0.2 | 0.2 | 0.2 | 0.2 | 0.2 |
| | Total | | 100.0 | 100.0 | 100.0 | 100.0 | 100.0 | 100.0 | 100.0 | 100.0 | 100.0 | 100.0 |
| Curing agent | Polyether polyol | PPG6000 (F = 3) | 47.7 | 47.7 | 47.7 | 47.7 | 47.7 | 47.7 | 47.7 | 47.7 | 47.7 | 47.7 |
| | (Meth)acrylamide compound | DMAA | 0.10 | | | | | | | | | |
| | | DEAA | | | | 0.10 | | | | | | |
| | | HEAA | | | | | | | 0.10 | | | |
| | | DMAPAA | | | | | | | | | | |
| | | ACMO | | | | | | | | | | 0.10 |
| | (Meth)acrylate compound 2 | | | | | | | | | | | |
| | Polymer of (meth)acrylamide compound | | | | | | | | | | | |
| | Plasticizer | DINP | 1.6 | 1.6 | 1.6 | 1.6 | 1.6 | 1.6 | 1.6 | 1.6 | 1.6 | 1.6 |
| | | Water | | | | | | | | | | |
| | Calcium carbonate 2 | KALFAIN 200 | 47.3 | 47.3 | 47.3 | 47.3 | 47.3 | 47.3 | 47.3 | 47.3 | 47.3 | 47.3 |
| | Catalyst | DMDEE | 0.3 | 0.3 | 0.3 | 0.3 | 0.3 | 0.3 | 0.3 | 0.3 | 0.3 | 0.3 |
| | Total | | 97.0 | 97.0 | 100.0 | 97.0 | 97.0 | 100.0 | 97.0 | 97.0 | 100.0 | 97.0 |
| Main agent/curing agent mixing ratio (weight ratio) | | | 10/1 | 10/1 | 10/1 | 10/1 | 10/1 | 10/1 | 10/1 | 10/1 | 10/1 | 10/1 |
| a content of the (meth)acrylamide compound in the two-part urethane-based adhesive composition (mass%) | | | 0.009 | 0.014 | 0.282 | 0.009 | 0.014 | 0.282 | 0.009 | 0.014 | 0.282 | 0.009 |

TABLE 1A-continued

| | Table 1A | Additional Working Example 4-1 | Working Example 4 | Comparative Example 11-1 | Additional Working Example 11-1 | Working Example 11 | Comparative Example 7-1 | Additional Working Example 7-1 | Working Example 7 | Working Example 5 | Additional Working Example 5-1 |
|---|---|---|---|---|---|---|---|---|---|---|---|
| Adhesiveness | 23° C., 50% RH for 3 days (initial) Shear strength | 2.1 MPa | 2.8 MPa | 3.5 MPa | 2.4 MPa | 3.0 MPa | 3.7 MPa | 2.2 MPa | 3.2 MPa | 2.8 MPa | 1.9 MPa |
| | Failure state | CF70 AF30 | CF80 AF20 | CF90 AF10 | CF80 AF20 | CF85 AF15 | CF90 AF10 | CF80 AF20 | CF90 AF10 | CF90 AF10 | CF70 AF30 |
| | Initial + immersed in 60° C. hot water for 3 days Shear strength | 1.5 MPa | 3.0 MPa | 3.2 MPa | 1.8 MPa | 3.6 MPa | 4.2 MPa | 1.3 MPa | 2.8 MPa | 2.8 MPa | 1.4 MPa |
| | Failure state | CF50 AF50 | CF85 AF15 | CF95 AF5 | CF35 AF65 | CF85 AF15 | CF95 AF5 | CF40 AF60 | CF90 AF10 | CF100 AF0 | CF30 AF70 |
| Main agent | Urethane prepolymer | 42.4 | 42.4 | 42.4 | 42.4 | 42.4 | 42.4 | 42.4 | 42.4 | 42.4 | 42.4 |
| | (Meth)acrylamide compound DMAA | | | | | | | | | | 3.8 |
| | DEAA | | | | | | | | | | |
| | Isocyanate adduct of HEAA | | | | | | | | | | |
| | ACMO | | | | | | | | | | |
| | (Meth)acrylate compound 1 | | | | | | | | | | |
| | Polymer of (meth)acrylamide compound | | | | | | | | | | |
| | Carbon black #200 MP | 20.6 | 20.6 | 20.6 | 20.6 | 20.6 | 20.6 | 20.6 | 20.6 | 20.6 | 20.6 |
| | Calcium carbonate 1 Super S | 19.3 | 19.3 | 19.3 | 19.3 | 19.3 | 19.3 | 19.3 | 19.3 | 19.3 | 19.3 |
| | Plasticizer DINP | 17.4 | 17.4 | 17.4 | 17.4 | 17.4 | 17.4 | 17.4 | 17.4 | 16.4 | 16.4 |
| | Catalyst DMDEE | 0.2 | 0.2 | 0.2 | 0.2 | 0.2 | 0.2 | 0.2 | 0.2 | 0.2 | 0.2 |
| | Total | 100.0 | 100.0 | 100.0 | 100.0 | 100.0 | 100.0 | 100.0 | 100.0 | 100.0 | 102.8 |
| Curing agent | Polyether polyol PPG6000 (F = 3) | 47.7 | 47.7 | 47.7 | 47.7 | 47.7 | 47.7 | 47.7 | 47.7 | 47.7 | 47.7 |
| | (Meth)acrylamide compound DMAA | | | | | | | | | | |
| | DEAA | | | | | | | | | | |
| | HEAA | | | | | | | | | | |
| | DMAPAA | | | | | | | | | | |
| | ACMO | | 3.1 | | | 3.1 | | | 3.1 | 1.0 | |
| | (Meth)acrylate compound 2 | | | | | | | | | | |
| | Polymer of (meth)acrylamide compound | 0.15 | | 0.10 | 0.15 | | | 0.10 | 0.15 | | |

TABLE 1A-continued

| | | | Working Example 6 | Additional Working Example 6-1 | Comparative Example 6-1 | Working Example 8 | Additional Working Example 8-1 | Comparative Example 8-1 | Working Example 12 | Additional Working Example 12-1 | Comparative Example 12-1 |
|---|---|---|---|---|---|---|---|---|---|---|---|
| Plasticizer | DINP | | 1.6 | 1.6 | 1.6 | 1.6 | 1.6 | 1.7 | 1.7 | 1.7 | 4.7 | 4.7 |
| | Water | | 47.3 | 47.3 | 47.3 | 47.3 | 47.3 | 47.3 | 47.3 | 47.3 | 47.3 | 47.3 |
| Calcium carbonate 2 | KALFAIN 200 | | | | | | | | | | | |
| Catalyst | DMDEE | | 0.3 | 0.3 | 0.3 | 0.3 | 0.3 | 0.3 | 0.3 | 0.3 | 0.3 | 0.3 |
| Total | | | 97.1 | 100.0 | 97.0 | 97.0 | 100.0 | 97.1 | 97.1 | 100.0 | 100.0 | 100.0 |
| Main agent/curing agent mixing ratio (weight ratio) | | | 10/1 | 10/1 | 10/1 | 10/1 | 10/1 | 10/1 | 10/1 | 10/1 | 10/1 | 10/1 |
| a content of the (meth)acrylamide compound in the two-part urethane-based adhesive composition (mass%) | | | 0.014 | 0.282 | 0.009 | 0.014 | 0.282 | 0.009 | 0.014 | 0.282 | 0.9 | 3.4 |
| Adhesiveness | 23° C., 50% RH for 3 days (initial) | Shear strength | 3.1 MPa | 2.9 MPa | 2.0 MPa | 2.8 MPa | 3.0 MPa | 1.8 MPa | 2.8 MPa | 2.6 MPa | 2.9 MPa | 2.7 MPa |
| | | Failure state | CF85 AF15 | CF85 AF15 | CF75 AF25 | CF90 AF10 | CF95 AF5 | CF70 AF30 | CF80 AF20 | CF80 AF20 | CF90 AF10 | CF80 AF20 |
| | Initial + immersed in 60° C. hot water for 3 days | Shear strength | 2.8 MPa | 3.1 MPa | 1.1 MPa | 2.9 MPa | 2.8 MPa | 1.3 MPa | 2.6 MPa | 2.5 MPa | 2.9 MPa | 2.6 MPa |
| | | Failure state | CF90 AF10 | CF90 AF10 | CF30 AF70 | CF95 AF5 | CF100 AF0 | CF20 AF80 | CF80 AF20 | CF80 AF20 | CF95 AF5 | CF80 AF20 |

| | Table 1A | | Working Example 6 | Additional Working Example 6-1 | Comparative Example 6-1 | Working Example 8 | Additional Working Example 8-1 | Comparative Example 8-1 | Working Example 12 | Additional Working Example 12-1 | Comparative Example 12-1 |
|---|---|---|---|---|---|---|---|---|---|---|---|
| Main agent | Urethane prepolymer | | 42.4 | 42.4 | 42.4 | 42.4 | 42.4 | 42.4 | 42.4 | 42.4 | 42.4 | 42.4 |
| | (Meth)acrylamide compound | DMAA | | 1.0 | 3.8 | 4.3 | | | | | | |
| | | DEAA | | | | | 1.0 | 3.8 | 4.3 | | | |
| | | Isocyanate adduct of HEAA | | | | | | | | | | |
| | | ACMO | | | | | | | | 1.0 | 3.8 | 4.3 |
| | (Meth)acrylate compound 1 | | | | | | | | | | | |
| | Polymer of (meth)acrylamide compound | | | | | | | | | | | |

TABLE 1A-continued

|  |  | | | | | | | | | |
|---|---|---|---|---|---|---|---|---|---|---|
| | Carbon black #200 MP | 20.6 | 20.6 | 20.6 | 20.6 | 20.6 | 20.6 | 20.6 | 20.6 | 20.6 |
| | Calcium carbonate 1 Super S | 19.3 | 19.3 | 19.3 | 19.3 | 19.3 | 19.3 | 19.3 | 19.3 | 19.3 |
| | Plasticizer DINP | 16.4 | 16.4 | 16.4 | 16.4 | 16.4 | 16.4 | 16.4 | 16.4 | 16.4 |
| | Catalyst DMDEE | 0.2 | 0.2 | 0.2 | 0.2 | 0.2 | 0.2 | 0.2 | 0.2 | 0.2 |
| | Total | 100.0 | 102.8 | 103.3 | 100.0 | 102.8 | 103.3 | 100.0 | 102.8 | 103.3 |
| Curing agent | Polyether polyol PPG6000 (F = 3) | 47.7 | 47.7 | 47.7 | 47.7 | 47.7 | 47.7 | 47.7 | 47.7 | 47.7 |
| | (Meth)acrylamide compound DMAA | | | | | | | | | |
| | DEAA | | | | | | | | | |
| | HEAA | | | | | | | | | |
| | DMAPAA | | | | | | | | | |
| | ACMO | | | | | | | | | |
| | (Methacrylate compound 2 | | | | | | | | | |
| | Polymer of (meth)acrylamide compound | | | | | | | | | |
| | Plasticizer DINP | 4.7 | 4.7 | 4.7 | 4.7 | 4.7 | 4.7 | 4.7 | 4.7 | 4.7 |
| | Water | | | | | | | | | |
| | Calcium carbonate 2 KALFAIN 200 | 47.3 | 47.3 | 47.3 | 47.3 | 47.3 | 47.3 | 47.3 | 47.3 | 47.3 |
| | Catalyst DMDEE | 0.3 | 0.3 | 0.3 | 0.3 | 0.3 | 0.3 | 0.3 | 0.3 | 0.3 |
| | Total | 100.0 | 100.0 | 100.0 | 99.9 | 99.9 | 99.9 | 100.0 | 100.0 | 100.0 |
| | Main agent/curing agent mixing ratio (weight ratio) | 10/1 | 10/1 | 10/1 | 10/1 | 10/1 | 10/1 | 10/1 | 10/1 | 10/1 |
| | a content of the (meth)acrylamide compound in the two-part urethane-based adhesive composition (mass%) | 0.9 | 3.4 | 3.8 | 0.9 | 3.4 | 3.8 | 0.9 | 3.4 | 3.8 |
| Adhesiveness | 23° C., 50% RH for 3 days (initial) Shear strength | 3.1 MPa | 2.8 MPa | 1.5 MPa | 3.1 MPa | 3.0 MPa | 1.8 MPa | 2.7 MPa | 2.8 MPa | 1.2 MPa |
| | Failure state | CF90 AF10 | CF85 AF15 | CF65 AF35 | CF90 AF10 | CF85 AF15 | CF70 AF30 | CF100 | CF90 AF10 | CF60 AF40 |
| | Initial + immersed in 60° C. hot water for 3 days Shear strength | 3.5 MPa | 3.2 MPa | 0.5 MPa | 3.1 MPa | 3.3 MPa | 0.6 MPa | 2.7 MPa | 2.6 MPa | 0.6 MPa |
| | Failure state | CF90 AF10 | CF80 AF20 | CF10 AF90 | CF90 AF10 | CF85 AF15 | CF5 AF95 | CF95 AF5 | CF85 AF5 | CF10 AF90 |

The details of each component shown in Table 1 above are as follows.

Urethane prepolymer: urethane prepolymer produced by mixing 70 parts by mass of polyoxypropylene diol (trade name: SANNIX PP2000, manufactured by Sanyo Chemical Industries, Ltd.; weight average molecular weight: 2,000), polyoxypropylene triol (trade name: SANNIX GP3000, manufactured by Sanyo Chemical Industries, Ltd.; weight average molecular weight: 3,000), and MDI (trade name: Sumidur 44S, manufactured by Sumika Bayer Urethane Co., Ltd.) in a manner that NCO/OH (molar ratio) was 2.0, and reacting the mixture in a condition at 80° C. for 5 hours.

Acrylamide: $CH_2$=CH—$CONH_2$
DMAA: N,N-dimethylacrylamide
DEAA: N,N-diethylacrylamide
HEAA: N-(2-hydroxyethyl)acrylamide
DMAPAA: N-(dimethylaminopropyl)acrylamide
ACMO: acryloylmorpholine Isocyanate adduct of HEAA: a reaction product was obtained by mixing 9.4 g of HEAA and 89.6 g of isocyanate compound (allophanate product of hexamethylene diisocyanate (HDI), trade name: Takenate D-178NL, manufactured by Mitsui Chemicals, Inc.; containing two isocyanate groups in each molecule) (at this time, the molar ratio of NCO/OH was 5) and then reacting these in a nitrogen atmosphere at 60° C. for 9 hours. The obtained reaction product was a mixture at least containing a compound produced by reacting one of the two isocyanate groups contained in the isocyanate compound with a hydroxy group of HEAA (in addition to an acrylamide group and an allophanate bond, also containing a urethane bond and an isocyanate group in each molecule), a compound produced by reacting both of the two isocyanate groups contained in the isocyanate compound with a hydroxy group of HEAA, and an unreacted isocyanate compound. The reaction product produced as described above was used as the isocyanate adduct of HEAA.

Carbon black: trade name: #200 MP, manufactured by NSCC Carbon Co., Ltd.

Calcium carbonate 1: heavy calcium carbonate, trade name: Super S, manufactured by Maruo Calcium Co., Ltd.

Calcium carbonate 2: calcium carbonate surface treated with fatty acid, KALFAIN 200, manufactured by Maruo Calcium Co., Ltd.

Polyether polyol: polyoxypropylene triol containing a little amount of polyoxyethylene, weight average molecular weight: 6,000, trade name: Preminol 7001K, manufactured by Asahi Glass Co., Ltd.

Plasticizer DINP: diisononyl phthalate, manufactured by J-Plus Co., Ltd.

Catalyst DMDEE: compound name: dimorpholinodiethylether, trade name: UCAT-660M, manufactured by San-Apro Ltd.

(Meth)acrylate compound 1: butyl acrylate (BA)
(Meth)acrylate compound 2: hydroxyethyl acrylate (HEA)

Polymer of (meth)acrylamide compound: In a 500 mL reaction vessel equipped with a condenser tube, nitrogen introducing tube, thermometer, and mixing equipment, 2.0 g of dimethylacrylamide and 23.0 g of butyl acrylate were dissolved in 200 mL of ethanol. After the reaction vessel was purged with nitrogen while the mixture was mixed for 30 minutes at room temperature, 0.162 g of azobisisobutyronitrile (AIBN) was added as a polymerization initiator to perform a polymerization reaction at 60° C. for 6 hours. The ethanol was then removed from the mixture after the reaction, using an evaporator to obtain a dimethylacrylamide-butyl acrylate copolymer. The obtained dimethylacrylamide-butyl acrylate copolymer was a liquid at room temperature. The polymer obtained as described above was used as the polymer of (meth)acrylamide compound. The polymer of (meth)acrylamide compound does not have a double bond.

From the results shown in Table 1 above, it was found that the adhesive composition prepared by blending no predetermined (meth)acrylamide compound exhibited poor adhesion (Comparative Example 1).

Furthermore, adhesive compositions prepared using (meth)acrylate (Comparative Examples 2 and 4) or using a polymer of (meth)acrylamide compound (Comparative Examples 3 and 5) exhibited poor adhesion.

On the other hand, the adhesive compositions containing the (meth)acrylamide compound exhibited excellent adhesion (Working Examples 1 to 12). Furthermore, it was found that the adhesive composition containing the (meth)acrylamide compound achieved high shear strength and excellent adhesion to base materials without using a primer (Working Examples 1 to 12).

From the results of Working Examples 1 to 12, it was found that the (meth)acrylamide compound was added to the main agent and/or the curing agent.

When at least one alkyl group that may have a hetero atom was bonded to a nitrogen atom of an amide bond contained in the (meth)acrylamide compound (Working Examples 1 to 6 and 8 to 12), even higher shear strength and even better adhesion were achieved compared to those of the case where two hydrogen atoms were bonded to the nitrogen atom (Working Example 7).

When Working Examples 1 and 2, which had the same ratio of the isocyanate group in the main agent to the hydroxy group in the curing agent, are compared, the case where the alkyl group substituting the nitrogen atom contained in the (meth)acrylamide compound was an ethyl group exhibited even better shear strength compared to the case of a methyl group. The results of Working Examples 5 and 6 were the same as those described above.

From the results of Working Examples 3 and 9 (the failure state evaluated after the tensile test performed after immersing in a hot water was CF 100%), the case where the (meth)acrylamide compound had a hydroxy group achieved even better hot water-resistant adhesion.

From the results of Working Examples 11 and 12, it was found that the case where the (meth)acrylamide compound had an ether bond exhibited even better adhesion.

In more detail, when Working Example 11, in which the (meth)acrylamide compound was contained in the curing agent, is compared to Working Examples 1, 2, 4, and 7 regarding the hot water-resistant adhesion, Working Example 11, in which the (meth)acrylamide compound had an ether bond, exhibited even better failure state and excellent hot water-resistant adhesion compared to those of Working Examples 1, 2, 4, and 7 in which no ether bond was contained.

Furthermore, when Working Example 12, in which the (meth)acrylamide compound was contained in the main agent, is compared to Working Examples 5, 6, and 8 regarding the initial adhesion, Working Example 12, in which the (meth)acrylamide compound had an ether bond, exhibited even better failure state and excellent initial adhesion compared to those of Working Examples 5, 6, and 8 in which no ether bond was contained.

The invention claimed is:
1. A two-part urethane-based adhesive composition comprising:

a main agent containing a urethane prepolymer having an isocyanate group, wherein the urethane prepolymer is produced by reacting polyoxypropylene diol, polyoxypropylene triol, and aromatic polyisocyanate; and a curing agent containing a compound having two or more active hydrogen-containing groups in each molecule, wherein the compound having two or more active hydrogen-containing groups in each molecule includes polyoxypropylene triol or ethylene oxide/propylene oxide copolymer triol;

one of the main agent or the curing agent containing a (meth)acrylamide compound, wherein the (meth)acrylamide compound is N-alkyl (meth)acrylamide having a hydroxy group, and the N-alkyl(meth)acrylamide having a hydroxy group is contained only in the curing agent, wherein the N-alkyl(meth)acrylamide having a hydroxy group is N-(2-hydroxyethyl)acrylamide, wherein a weight ratio of the main agent/the curing agent is from 10/1 to 10/8, wherein a molar ratio of the isocyanate group contained in the urethane prepolymer to the active hydrogen-containing group contained in the compound having two or more active hydrogen-containing groups is from 0.8 to 20, wherein a content of the (meth)acrylamide compound is from 0.01 to 3.5 mass % in the two-part urethane based adhesive composition, and wherein the two-part urethane-based adhesive composition is cured by moisture.

2. The two-part urethane-based adhesive composition according to claim 1, wherein at least one of the main agent and the curing agent further contains at least one of carbon black and calcium carbonate.

3. The two-part urethane-based adhesive composition according to claim 1, wherein the two-part urethane-based adhesive composition is used to adhere an olefin base material.

4. The two-part urethane-based adhesive composition according to claim 1, wherein failure state of a test sample after tensile test is 80% or more of cohesive failure, wherein the test sample is produced by adhering two pieces of adherends with the two-part urethane-based adhesive composition, wherein the produced test sample is left in a condition of 23° C. and 50% RH for 3 days, and then immersed in a hot water at 60° C. for 3 days, and wherein the tensile test is performed on the test sample.

* * * * *